United States Patent [19]
Asanuma et al.

[11] Patent Number: 5,534,595
[45] Date of Patent: Jul. 9, 1996

[54] SYNDIOTACTIC PROPYLENE COPOLYMER, PREPARATION OF THE SAME, AND RESIN COMPOSITION CONTAINING THE SAME

[75] Inventors: Tadashi Asanuma, Takaishi; Hiroshi Matsuzawa, Atsugi; Tateyo Sasaki; Kaoru Kawanishi, both of Takaishi, all of Japan

[73] Assignee: Mitsui Toatsu Chemicals, Inc., Tokyo, Japan

[21] Appl. No.: 468,316

[22] Filed: Jun. 6, 1995

Related U.S. Application Data

[63] Continuation of Ser. No. 270,226, Jul. 1, 1994, abandoned, which is a continuation of Ser. No. 63,057, May 19, 1993, abandoned, which is a continuation of Ser. No. 683,771, Apr. 11, 1991, abandoned.

[30] Foreign Application Priority Data

| Apr. 18, 1990 | [JP] | Japan | 2-100386 |
| Jul. 19, 1990 | [JP] | Japan | 2-189378 |
| Nov. 28, 1990 | [JP] | Japan | 2-323140 |

[51] Int. Cl.[6] .................. C08F 4/642; C08F 210/06
[52] U.S. Cl. .............. 525/326.5; 525/191; 525/192; 525/326.6; 525/379; 526/160; 526/348; 526/279; 526/351
[58] Field of Search ............. 526/239, 279, 526/160, 348; 525/326.5

[56] References Cited

U.S. PATENT DOCUMENTS

| 3,258,455 | 6/1966 | Natta et al. | |
| 3,305,538 | 2/1967 | Natta et al. | |
| 3,335,121 | 8/1967 | Natta et al. | |
| 4,734,472 | 3/1988 | Chung | 526/239 |
| 4,751,276 | 6/1988 | Chung | 526/158 |
| 4,812,529 | 3/1989 | Chung | 525/326.1 |
| 4,892,851 | 1/1990 | Ewen | 502/104 |
| 5,001,244 | 3/1991 | Welborn, Jr. | 556/53 |
| 5,017,714 | 5/1991 | Welborn, Jr. | 556/12 |
| 5,026,798 | 6/1991 | Canich | 526/127 |
| 5,057,475 | 10/1991 | Canich et al. | 502/104 |
| 5,084,534 | 1/1992 | Welborn et al. | 526/160 |
| 5,153,157 | 10/1992 | Hlatky et al. | 502/117 |

FOREIGN PATENT DOCUMENTS

| 0014822 | 9/1980 | European Pat. Off. |
| 0146138 | 6/1985 | European Pat. Off. |
| 0274912 | 7/1988 | European Pat. Off. |
| 0321852 | 6/1989 | European Pat. Off. |
| 88/08856 | 11/1988 | WIPO |

OTHER PUBLICATIONS

Chung et al, "Synthesis of Polyacohols via Ziegler–Natta Polymerization," *Macromolecules*, 1988, vol. 21, pp. 865–869.

Ramakrishnan et al, "Functional Group Containing Copolymers Prepared by the Ziegler–Natta Process," *Macromolecules*, 1990, vol. 23, pp. 378–382.

Chung et al, "Synthesis of Functionalized Polypropylene," *Macromolecules*, 1991, vol. 24, pp. 970–972.

*Primary Examiner*—Fred Zitomer
*Attorney, Agent, or Firm*—Burns, Doane, Swecker & Mathis

[57] ABSTRACT

Disclosed is a syndiotactic propylene copolymer containing 0.01 to 40 mol % of olefin units containing —OH group in the side chain. Of absorption peaks attributed to the methyl groups of the propylene units on an absorption spectrum by $^{13}$C-NMR of the copolymer, the intensity of an absorption peak observed at about 20.2 ppm is 0.3 or more of the intensity of absorption peaks of all the methyl groups attributed to the propylene units. The copolymer is produced by copolymerizing propylene and an alkenylsilane or alkenylborane compound in the presence of a catalyst system comprising an asymmetric ligands-having transition metal compound and an aluminoxane, followed by heat-treating the resulting propylene-alkenylsilane copolymer in the presence of a trialkylamine oxide and KF.HF or oxidizing and decomposing the resulting propylene-alkenylborane compound copolymer. Also disclosed is a resin composition comprising the copolymer and other polyolefin(s).

15 Claims, 4 Drawing Sheets

SYNDIOTACTIC PROPYLENE COPOLYMER, PREPARATION OF THE SAME, AND RESIN COMPOSITION CONTAINING THE SAME

This application is a continuation of application Ser. No. 08/270,226, filed Jul. 1, 1994, abandoned, which is a continuation of application Ser. No. 08/063,057, filed May 19, 1993, abandoned, which is a continuation of application Ser. No. 07/683,771, filed Apr. 11, 1991, abandoned.

BACKGROUND OF THE INVENTION a) Field of the Invention

The present invention relates to propylene copolymers having a syndiotactic structure, Preparation of the same and resin compositions containing the same. More particularly, it relates to propylene copolymers having —OH group in the side chain, which copolymers have high syndiotacticity, processes for producing the syndiotactic propylene copolymers and resin compositions containing one or more of the copolymers.

b) Description of the Prior Art

Polyolefins are low-priced and have relatively excellent physical properties. However, as having no polar group, they have some problems that the gas-barrier property is poor and the adhesiveness to polar group-having polymers is poor. In order to overcome the problems, a polar group-having polymer may be added to such a polyolefin. However, in general, the addition of such a polymer involves another problem that polar group-having polymers could hardly be blended with polyolefins and the resulting blend would often lose the physical properties inherent in polyolefins.

The existence of syndiotactic polypropylene has been known for many years. However, polypropylene obtained by a conventional low-temperature polymerization method of using a catalyst comprising a vanadium compound, ether and an organoaluminium compound has poor syndiotacticity so that it can hardly be considered to have the characteristic properties as syndiotactic polypropylene. On the other hand, where ordinary olefin polymerization catalysts are used, olefins having polar groups such as —OH are not almost polymerized. Under the situation, polar group-having stereoregular polyolefins have heretofore been unknown.

J. A. Ewen et al. found that polypropylene having such good tacticity as exceeding 0.7 in terms of syndiotactic pentad fraction can be obtained by polymerizing propylene in the presence of a catalyst comprising a transition metal compound having asymmetric ligands and an aluminoxane (J. Am. Chem. Sot., 1988, 110, 6255–6256). T. C. Chung reported that a propylene-alkenyl alcohol copolymer having an isotactic structure can be obtained by oxidizing and decomposing a propylene copolymer composed of an alkenylborane and propylene and having an isotactic structure (Macromolecules, 1988, 21, 865).

Copolymers having a substantially syndiotactic structure and having —OH group in the side chain have heretofore been unknown. Such copolymers are expected to have physical properties which could not be seen in any conventional copolymers, and compositions containing such copolymers are also expected to have physical properties which could not be seen in any conventional compositions.

SUMMARY OF THE INVENTION

An object of the present invention is to provide a novel propylene copolymer having —OH group in the side chain and having a substantially syndiotactic structure.

Another object of the present invention is to provide a method of producing the novel propylene copolymer.

Still another object of the present invention is to provide a resin composition which contains the novel propylene polymer and which has excellent physical properties.

Other objects will become apparent from the following description of the present invention.

In one aspect of the present invention, there is provided a syndiotactic propylene copolymer having —OH group in the side chain which comprises repeating units of the formula (I):

and from 0.01 to 40 mol % of repeating units of the formula (II):

where n represents 0 or an integer of 1 or more, wherein, of absorption peaks attributed to the methyl groups of the propylene units on an absorption spectrum by $^{13}$C-NMR, the intensity of an absorption peak observed at about 20.2 ppm is 0.3 or more of the intensity of absorption peaks of all the methyl groups attributed to the propylene units.

In the invention, the propylene copolymer having —OH group in the side chain means a polymer merely comprising repeating units of propylene and repeating units having —OH group in the side chain.

In another aspect of the present invention, there is also provided a method of producing the above syndiotactic propylene copolymer, wherein propylene and an alkenylsilane of the formula (III):

$$H_2C=CH-(CH_2)_n-SiR^1_3 \quad (III)$$

where three $R^1$s independently represent a hydrogen atom, a halogen atom, or a saturated hydrocarbon residue having from 1 to 20 carbon atoms, and n represents 0 or an integer of from 1 to 20, are copolymerized in the presence of a catalyst comprising a transition metal compound having asymmetrically interconnected two ligands and an aluminoxane, and thereafter the resulting copolymer is heated in the presence of a trialkylamine oxide and KF.HF.

In still another aspect of the present invention, there is further provided a method of producing the above syndiotactic propylene copolymer, wherein propylene and an alkenylborane compound of the formula (IV):

$$H_2C=CH-(CH_2)_n-BR^2_2 \quad (IV)$$

where two $R^2$s independently represent a hydrocarbon residue having from 1 to 12 carbon atoms, and n represents 0 or an integer of 1 or more, are copolymerized in the presence of the above-mentioned catalyst, and thereafter the resulting copolymer is oxidized and decomposed.

In still another aspect of the present invention, there is provided a polyolefin resin composition comprising the above-mentioned propylene copolymer and other polyolefin(s).

BRIEF DESCRIPTION OF THE DRAWINGS

In the drawings attached hereto.

DESCRIPTION OF THE PREFERRED EMBODIMENT

Figure 1:
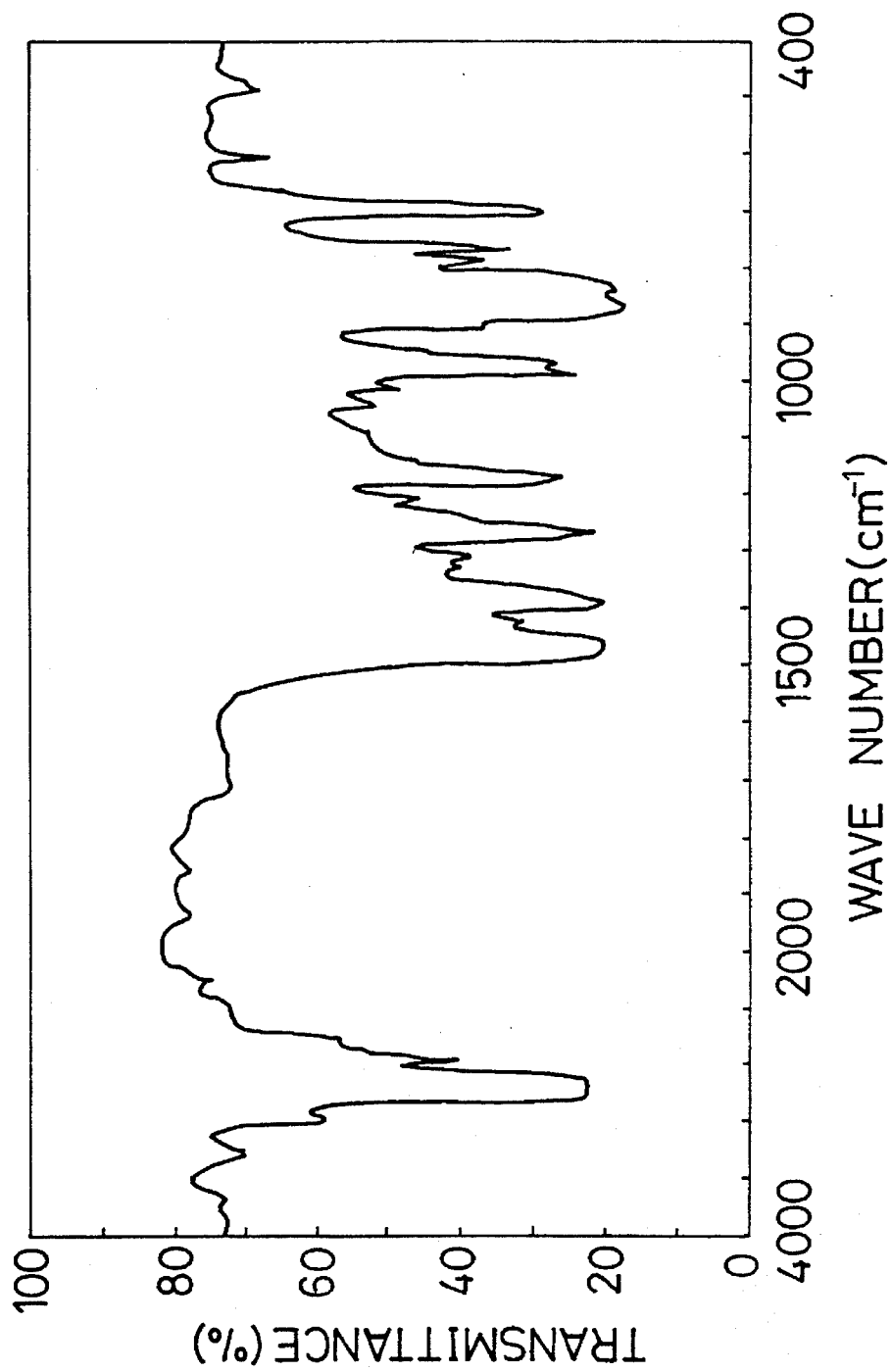
FIG. 1 is an infrared absorption spectrum of a syndiotactic propylene copolymer having —OH groups as obtained in Example 1.

Methods of producing a propylene copolymer having a syndiotactic structure of the present invention will be mentioned below.

As examples of the catalyst system to be used in preparation of the copolymer of the present invention, the catalyst systems described in the above-mentioned J. A. Ewen et al literature are referred to. In addition to them, other catalyst systems having a different structure may also be used provided that, when a propylene homopolymer is produced in the presence of a catalyst system containing them, the homopolymer could be one having such good tacticity as being about 0.7 or more in terms of syndiotactic pentad fraction (A. Zambelli et al., Macromolecules, Vol. 6, 925(1973); ibid., Vol. 8, 687 (1975)). As a transition metal compound having asymmetrically interconnected ligands which is one component of the catalyst system to be used in the present invention, the compounds of a formula (V):

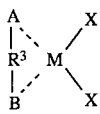
(V)

where A and B are different from each other and independently represent a cyclic unsaturated hydrocarbon residue, $R^3$ represents a hydrocarbon residue having from 1 to 20 carbon atoms, or a silicon- or germanium-containing group, which links A and B to each other via it, X represents a halogen atom, or a hydrocarbon residue having from 1 to 20 carbon atoms, and M represents a metal atom to be selected from titanium, zirconium or hafnium are preferred.

In the formula (V), examples of A and B include monocyclic or polycyclic unsaturated hydrocarbon residues each having from 5 to 30 carbon atoms. Specific examples of them include monocyclic unsaturated hydrocarbon residues, such as a cyclopentadienyl group or a substituted cyclopentadienyl group in which a part or all of hydrogen atoms is/are substituted by (an) alkyl group(s) each having from 1 to 10 carbon atoms (where the alkyl moiety may have a structure of being bonded to the cyclopentadiene ring at the terminal thereof), as well as polycyclic unsaturated hydrocarbon residues, such as an indenyl or fluorenyl group or a substituted indenyl or fluorenyl group in which a part or all of hydrogen atoms is/are substituted by (an) alkyl group(s) each having from 1 to 10 carbon atoms. As $R^3$, preferred are a dialkylmethylene group, a dialkylsilylene group and a dialkylgerylene group. Precisely, there are mentioned, as preferred examples of $R^3$, groups of $R^4_2C>$, $R^4_2Si>$ and $R^4_2Ge>$ (where $R_4$'s may be same as or different from each other and each represents a hydrogen atom or an alkyl group having from 1 to 20 carbon atoms). There is further mentioned, in addition thereto, an ethylidene group of —$CR^4_2$—$CR^4_2$— (where $R_4$ has the same meaning as mentioned above). As examples of X, there are mentioned fluorine, chlorine, bromine or iodine atom, and an alkyl group such as a methyl, ethyl, propyl or butyl group, and a cyclic unsaturated hydrocarbon residue such as a cyclopentadienyl group. Above all, especially preferred is a chlorine atom or a methyl group.

Of the above-mentioned transition metal compounds having asymmetrically interconnected ligands, preferred are isopropyl(cyclopentadienyl-1-fluorenyl)hafnium dichloride and isopropyl(cyclopentadienyl-1-fluorenyl)zirconium dichloride as well as compounds derived from them by partly substituting hydrogens by (an) alkyl group(s), as described in the above-mentioned J. A. Ewen et al literature. In using the above-mentioned transition metal compounds in the present invention, purified ones having a high purity are preferred as giving copolymers having a much higher stereoregularity.

As an aluminoxane, which is the other component of the catalyst system to be used in the present invention, the compounds of the formula (VI):

(VI)

where $R^5$ represents a hydrocarbon residue having from 1 to 3 carbon atoms, and m represents an integer of from 1 to 50, and the formula (VII):

(VII)

where $R^5$ and m have the same meanings as mentioned above, are preferred. Especially preferred are compounds of the above-mentioned formulae where $R^5$ is a methyl group and m is 5 or more.

The proportion of the aluminoxane to the above transition metal compound in the catalyst system of the invention may be from 1/1 to 1000000/1 by mol, especially preferably from 10/1 to 5000/1 by mol.

Examples of the alkenylsilane of the formula (III) to be copolymerized with propylene include vinylsilane, allylsilane, butenylsilane, pentenylsilane and hexenylsilane, as well as compounds to be derived from such silanes by substituting from 1 to 3 hydrogens by (a) halogen atom(s) or especially by (a) saturated hydrocarbon residue(s) each having from 1 to 20 carbon atoms.

Examples of the alkenylborane compound to be copolymerized with propylene include compounds of formula (IV) where $R^2$ is an alkyl group such as a methyl, ethyl, propyl, butyl, pentyl or hexyl group, compounds of formula (IV) where two alkyl groups of $R^2$s are bonded to each other, and compounds of formula (IV) where $R^2$ is a cyclic group, such as B-7-octenyl-9-borabicyclo[3,3,1]nonane.

The method of copolymerizing propylene and the above-mentioned alkenylsilane or alkenylborane compound is not specifically defined but any of a solvent polymerization method of using an inert medium, a bulk polymerization method of effecting polymerization substantially in the absence of a solvent and a gaseous polymerization method may be employed.

The polymerization temperature is preferably within the range between −100° C. and 200° C., especially preferably between −100° C. and 100° C.; and the polymerization pressure is preferably from atmospheric pressure to 100 kg/cm$^2$ (gauge pressure), especially preferably from atmospheric pressure to 50 kg/cm$^2$ (gauge pressure).

The amount of the above-mentioned alkenylsilane or alkenylborane compound to be copolymerized is so controlled that the proportion of the repeating units of the above-mentioned formula (II) may be from 0.01 to 40 mol %, preferably from 0.05 to 20 mol %, especially preferably from 0.1 to 20 mol %, to the resulting copolymer.

The propylene-alkenylsilane copolymer obtained is then heat-treated in the presence of a trialkylamine oxide and KF.HF, whereby —$SiR^1_3$ group in the copolymer is converted to —OH group. Regarding the details of the condition for the heat-treatment, for example, those illustrated in Tetrahedron Letter, 27, 75 (1986) are referred to. Briefly, as the trialkylamine oxide, one having alkyl groups each with approximately from 1 to 6 carbon atoms may be used, and the amount of the compound to be used may be from 0.01 to 1000 molar times, preferably from 0.1 to 100 molar times, to the alkenylsilane units in the copolymer to be heat-treated. The amount of KF.HF to be used may be from 0.01 to 1000 molar times, preferably from 0.1 to 100 molar times, to the alkenylsilane units. The reaction is preferably carried out in the presence of a solvent, and a hydrocarbon compound having from 5 to 25 carbon atoms is preferably used as a solvent. The reaction temperature is generally from room temperature to 300° C., especially preferably from 50° C. to 200° C.

The propylene-alkenylborane copolymer obtained is then oxidized and decomposed. In the step, the condition for oxidation and decomposition is not specifically defined but any condition employable for decomposing an alkylboron to give an alcohol may directly apply to the step. For instance, the copolymer may be treated with an oxidizing agent such as hydrogen peroxide under an alkaline condition whereby —$BR^2_2$ group in the copolymer may easily be decomposed to —OH group.

Of absorption peaks attributed to the methyl groups of the propylene units on a $^{13}C$-NMR absorption spectrum of the thus obtained copolymer of the invention, the intensity of an absorption peak observed at about 20.2 ppm is 0.3 or more of the intensity of absorption peaks of all the methyl groups attributed to the propylene units. If the ratio is less than 0.3, there would be a problem that the surface of the shaped article from the copolymer is often tacky.

If the content of the alkenylsilane units or alkenylborane units is less than 0.01 mol %, the copolymer could not display the effect resulting from the existence of —OH groups therein even though all the alkenylsilane units or alkenylborane units are converted into —OH groups. On the contrary, however, if it is more than 40 mol %, the copolymer could not display physical properties as a syndiotactic polypropylene.

Regarding the molecular weight of the above-mentioned copolymer, it is desired the copolymer has an intrinsic viscosity of 0.05 dl/g or more, generally approximately from 0.1 to 10 dl/g, as measured at 135° C. in the form of a tetralin solution, in view of the easy use of the copolymer.

The ratio of the weight-average molecular weight to the number-average molecular weight of the above-mentioned copolymer as measured at 135° C. in the form of a 1,2,4 -trichlorobenzene solution is not specifically defined but may fall within the range between 1.5 to 20, as it depends upon the polymerization condition. Anyway, the preferred range may suitably be selected in accordance with the use of the copolymer. In general, the ratio may fall within the range between 2 and 10 or so.

On a $^{13}C$-NMR absorption spectrum of the thus obtained copolymer of the invention, if, of absorption peaks attributed to the methyl groups of the propylene units, the ratio of the intensity of an absorption peak observed at about 20.2 ppm to the intensity of absorption peaks of all the methyl groups attributed to the propylene units is desired to be such higher, it is effective to use a catalyst system containing a purified transition metal compound, having a high purity of 90% or more, as mentioned above, and to effect polymerization at a low temperature of 100° C. or lower, and it is also effective to wash the copolymer with a hydrocarbon solvent or the like.

Exemplary hydrocarbon solvents usable for the purpose are those having from 3 to 20 carbon atoms. For instance, there are mentioned propylene, and saturated hydrocarbon compounds such as propane, butane, pentane, hexane, heptane, octane and nonane, as well as aromatic hydrocarbon compounds such as benzene, toluene, xylene and ethylbenzene, and compounds to be derived from them by substituting a part or all of hydrogens by fluorine, chlorine, bromine and/or iodine atom(s). Additionally, alcohols having from 1 to 20 carbon atoms as well as ethers and esters each having from 2 to 20 carbon atoms, which may dissolve or disperse low molecular atactic components, are also usable as the solvent. The washing method is not specifically defined and it may be effected generally at a temperature of 0° C. to 100° C.

The copolymer of the present invention may be blended with polyolefins so as to improve the physical properties of the copolymer and is used as a resin composition.

As polyolefins to be blended with the copolymer of the present invention to form a resin composition of the invention, preferred are propylene (co)polymers. The propylene (co)polymers usable for the purpose include isotactic polypropylenes available in the market (including not only propylene homopolymers but also propylene random or block copolymers with ethylene or an alpha-olefin having from 4 to 12 carbon atoms) as well as syndiotactic polypropylenes to be obtained by homopolymerization of propylene or by copolymerization of propylene with ethylene or an alpha-olefin having from 4 to 12 carbon atoms in the presence of the above-mentioned catalyst.

The polyolefins to be blended with the copolymer of the present invention are not specifically defined with respect to the molecular weight thereof, but anyone having a melt flow index as measured at 230° C. of being approximately from 0.1 to 100 can be employed. The proportion of the copolymer of the present invention to the other polyolefin(s) to be blended is generally so controlled that the content of the alkenyl alcohol units in the resulting resin composition may fall within the range of from 0.01 to 10% by Weight. Preferably, it is so controlled that the content of the copolymer of the invention in the resulting resin composition is to fall within the range of from 0.1 to 100% by weight, especially preferably from 1 to 50% by weight. The blending method is not specifically defined. For instance, the components may well be dry-blended in an ordinary Henschel mixer and then melt-granulated. Needless to say, it is possible to add various known additives such as stabilizer, nucleating agent and the like, to the resin composition of the present invention.

Examples of the present invention will hereinafter be described. It is however to be noted that these examples are merely illustrative of the present invention and shall not be taken as limiting the present invention.

Example 1

Figure 2:
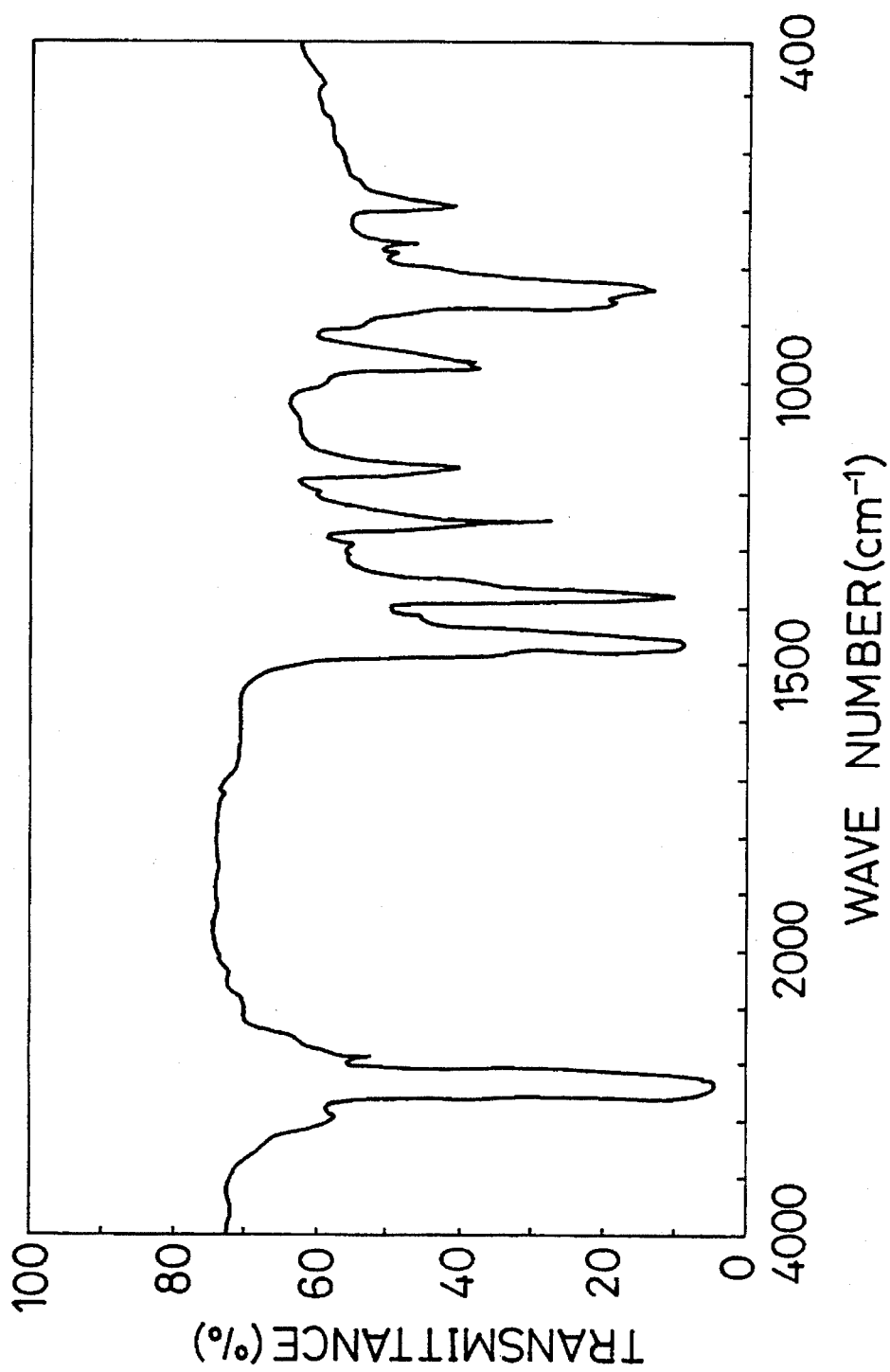
FIG. 2 is an infrared absorption spectrum of a copolymer of propylene and allyltrimethylsilane obtained in Example 1.

Isopropylcyclopentadienyl-1-fluorene which had been synthesized in a manner known per se in the art was converted to the lithium salt. The lithium salt was reacted with zirconium tetrachloride, followed by purification to obtain isopropyl(cyclopentadienyl-1-fluorenyl)zirconium dichloride. 10 mg of the thus obtained isopropyl(cyclopentadienyl-1-fluorenyl)zirconium dichloride and 1.36 g of methylaluminoxane having a polymerization degree of about 16 (product of TOSOH-AKZO CORPORATION) were dissolved in 100 ml of toluene, and the resulting solution was put in an autoclave having internal capacity of 300 ml along with 20 ml of trimethylallylsilane and 60 g of propylene. They were polymerized at 30° C. for 2 hours. After the polymerization, unreacted monomers were purged and the remaining product was filtered. The powder thus obtained was washed four times each with I liter of methanol and dried at 80° C. under reduced pressure to obtain 26 g of a polymer. By elementary analysis, the polymer was verified to contain 8.5% by weight of trimethylallylsilane. FIG. 2 shows an infrared absorption spectrum of the polymer.

5 g of the polymer thus obtained was dispersed in 40 ml of toluene, and 40 ml of water, 2 g of trimethylamine oxide and 2.5 g of KF.HF were added thereto and reacted at 100° C. for 10 hours. After the reaction, the toluene layer was separated, cooled and filtered to obtain a polymer.

The thus obtained polymer was verified to still contain 4.5% by weight of unreacted allyltrimethylsilane units, by analysis of silicon. FIG. 1 shows an infrared absorption spectrum of the polymer, in which absorptions of —OH groups (about 2.1% by weight) were observed at 3400 cm$^{-1}$ and 1040 cm$^{-1}$. By $^{13}$C-NMR, the intensity of an absorption peak as measured at about 20.2 ppm was 0.69 of the intensity of absorption peaks to be attributed to all the methyl groups of the propylene units. The polymer had an intrinsic viscosity (hereinafter referred to as "η") as measured at 135° C. in the form of a tetralin solution of being 0.47 dl/g. It had a ratio of the weight-average molecular weight to the number-average molecular weight (hereinafter referred to as "MW/MN") as measured at 135° C. in the form of a 1,2,4-trichlorobenzene solution of being

Example 2

The same process as in Example 1 was repeated to obtain 24 g of a copolymer, except that trimethylvinylsilane was used in place of allyltrimethylsilane. The copolymer thus produced contained 6.5% by weight of trimethylvinylsilane, and this was treated in the same manner as in Example 1 to obtain a copolymer containing 4.1% by weight of trimethylvinylsilane units and having —OH groups (about 1.1% by weight). The copolymer had η of 0.64 dl/g and MW/MN of 2.1. By $^{13}$C-NMR of the copolymer, the intensity of an absorption peak as measured at about 20.2 ppm was 0.72 of the intensity of absorption peaks to be attributed to all the methyl groups of the propylene units.

Example 3

15 mg of the isopropyl(cyclopentadienyl-1-fluorenyl)zirconium dichloride as obtained in Example 1 and 2 g of methylaluminoxane were dissolved in 500 ml of toluene, and the resulting solution was charged into an autoclave having an internal capacity of one liter along with 10 g of 7-octenyl-9-borabicyclo[3,3,1]nonane and 10 g of propylene. They were polymerized at 30° C. for 4 hours. After the polymerization, 200 ml of isopropyl alcohol was added to the polymerization system whereby 12 g of a polymer precipitated out. By elementary analysis, the polymer contained 25% by weight of B-7-octenyl-9-borabicyclo[3,3,1]nonane.

5 g of the polymer was dispersed in 200 ml of tetrahydrofuran, 5 ml of 6N sodium hydroxide solution was added thereto and cooled to 5° C., and 5.5 ml of aqueous 31% hydrogen peroxide solution was added thereto. The whole was then heated up to 50° C. and stirred for 4 hours at the elevated temperature of 50° C. After the reaction, petroleum ether was added to the reaction mixture, from which 2.5 g of a polymer precipitated out.

Figure 3:
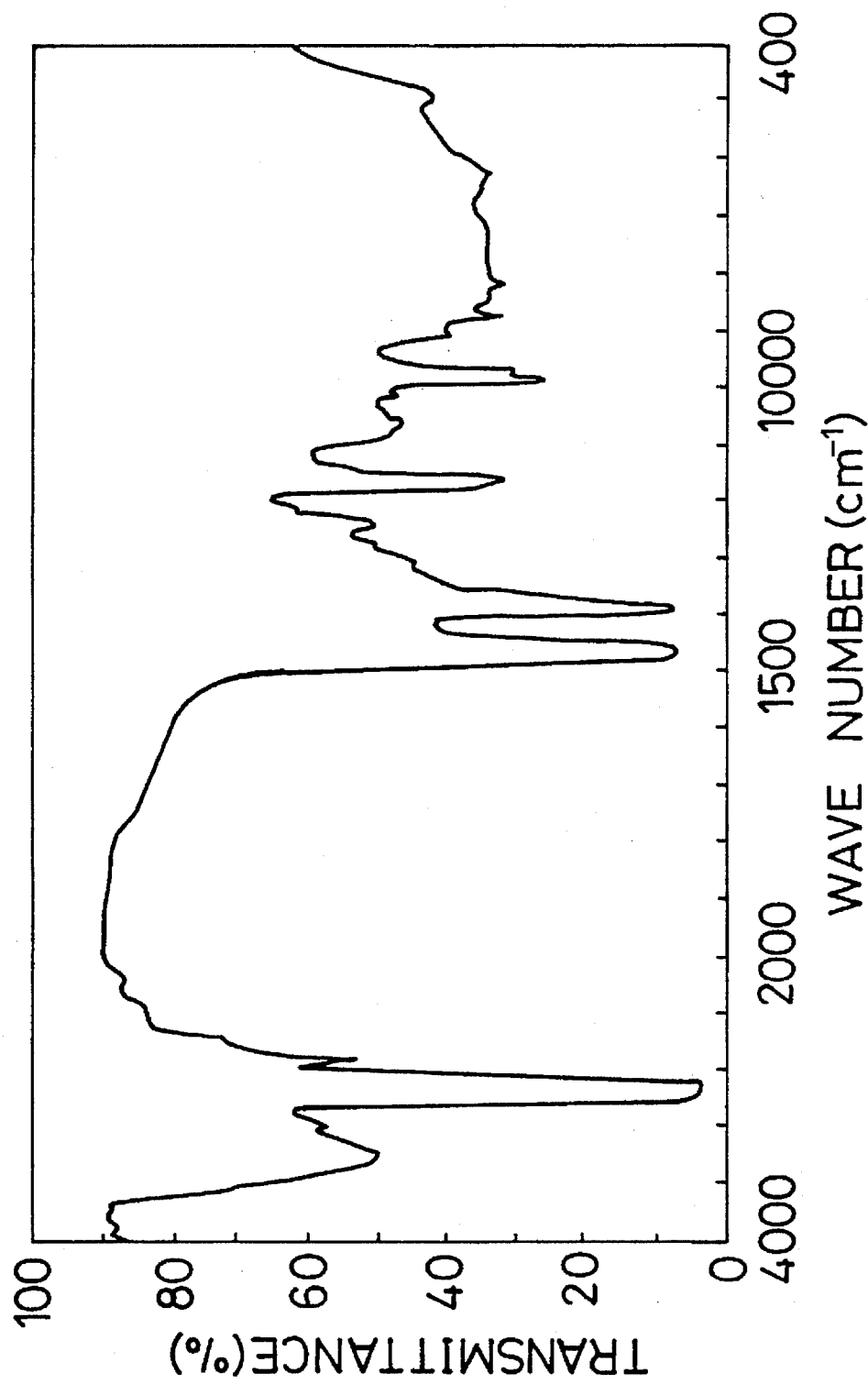
FIG. 3 is an infrared absorption spectrum of a syndiotactic propylene copolymer having —OH groups obtained in Example 3.
Figure 4:
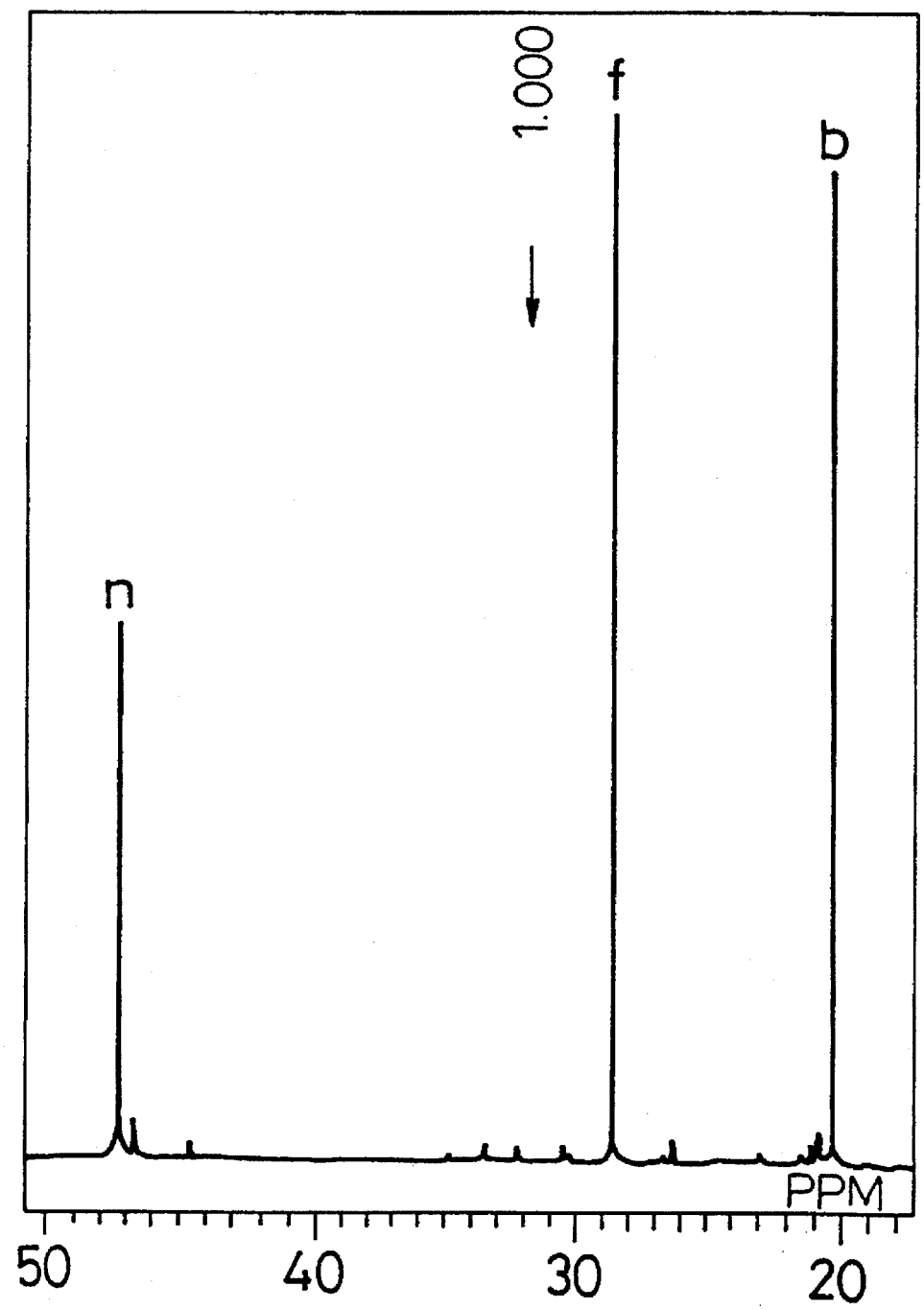
FIG. 4 is an absorption spectrum by $^{13}$C-NMR of a syndiotactic propylene copolymer having —OH groups obtained in Example 3.

The polymer thus obtained contained B-7-octenyl-9-borabicyclo[3,3,1]nonane and contained —OH groups (about 5.7 mol %). FIG. 3 shows an infrared absorption spectrum of the polymer; and FIG. 4 shows a 13C-NMR absorption spectrum thereof.

By $^{13}$C-NMR of the copolymer, the intensity of an absorption peak as measured at about 20.2 ppm was 0.68 of the intensity of absorption peaks to be attributed to all the methyl groups of the propylene units. The copolymer had η of 0.45 dl/g measured at 135° C. in the form of a tetralin solution and had a ratio of the weight-average molecular weight to the number-average molecular weight (MW/MN) of being 2.5 as measured at 135° C. in the form of a 1,2,4-trichlorobenzene solution.

Example 4

0.2 g of the isopropyl(cyclopentadienyl-1-fluorenyl)zirconium dichloride as obtained in Example 1 and 30 g of methylaluminoxane were dissolved in 80 liters of toluene, and the resulting solution was charged into an autoclave having an internal capacity of 200 liters. Propylene was introduced into the autoclave under polymerization pressure of 3 kg/cm$^2$-G, and polymerization was carried out at 20° C. for 2 hours. Methanol and methyl aceracetate were added to the thus obtained polymer mixture, which was treated at 30° C. Then, this was washed with an aqueous hydrochloric acid solution and filtered to obtain 5.6 kg of syndiotactic polypropylene. By $^{13}$C-NMR, the polypropylene had a syndiotactxc pentad fraction of 0.935. It had η of 1.45 dl/g and MW/MN of 2.2.

To 100 parts by weight of the polypropylene were added parts by weight of the copolymer as obtained in Example 3 and 0.1 part by weight of a phenolic stabilizer, and the resulting blend was granulated through an extruder and then melt-pressed at 200° C. to form a 1 mm thick sheet. The following physical properties of the sheet were measured.

Flexural stiffness, kg/cm$^2$: ASTM D-747 (23° C.)

Tensile yield strength, kg/cm$^2$: ASTM D-638 (23° C.)

Elongation at breakage, %: ASTM D-638 (23° C.)

Izod impact strength (notched), kg.cm/cm: ASTM D-638 (23° C., −10° C.)

Haze, %: ASTM D1003

The sheet had 5100 kg/cm$^2$ flexural stiffness, 220 kg/cm$^2$ tensile yield strength, 540% elongation at breakage, 13.8 and 3.5 kg.cm/cm Izod impact strengths (at 23° C. and −10° C. respectively), and 29% haze.

The sheet was brush-coated with an acrylic coating composition Unirock (product by Rock Paint Co.) and baked and dried in an air oven at 60° C. for 30 minutes. For measuring the adhesion strength of the coated film to the sheet body, the test piece was subjected to a cross-cut tape-peeling test (JIS K-5400). As a result of the test, the number of the coated film squares as remained after the test was 90 and the adhesion strength of the coated film was good. As opposed to the case, the sheet formed from a copolymer-free homopolypropylene gave the number of being 0 (zero).

Example 5

A 0.5 mm thick press sheet was produced from the copolymer obtained in Example 3. The oxygen gas-permeability of the sheet was measured to be 100 ml/m²·atm·24 hr.

On the other hand, the oxygen gas-permeability of the syndictactic polypropylene as obtained in Example 4 was also measured for comparison, which was 800 ml/m²·atm·24 hr.

As is obvious from these data, the shaped article (press sheet) as produced from the copolymer of the present invention has an excellent gas-barrier property.

It is expected that the copolymer of the present invention has improved characteristics of high adhesiveness, coatability and gas-barrier property because of introduction of olefin units having —OH groups, with still having the excellent characteristics of high transparency and impact strength owing to the syndictactic polypropylene structure of itself. Accordingly, the copolymer of the present invention is an extremely useful copolymer as having an excellent transparency and high stiffness and impact resistance and also having other various excellent functions.

Additionally, the resin composition comprising the copolymer and other polyolefin(s) may give a shaped article having good and well-balanced physical properties.

While the invention has been described in detail and with reference to specific embodiments thereof, it will be apparent to one skilled in the art that various changes and modifications can be made therein without departing from the spirit and scope thereof.

What is claimed is:

1. A resin composition comprising a polyolefin and a propylene copolymer substantially having a syndiotactic structure which comprises repeating units of the formula (I):

from 0.01 to 40 mol % of repeating units of the formula (II):

where n represents 0 or an integer of 1 or more, wherein, of absorption peaks attributed to the methyl groups of the propylene units on an absorption spectrum by $^{13}$C-NMR, the intensity of an absorption peak observed at about 20.2 ppm is 0.3 or more of the intensity of absorption peaks of all the methyl groups attributed to the propylene units; the content of the propylene copolymer being from 0.1 to 100% by weight.

2. The resin composition according to claim 1, in which the content of the propylene copolymer is from 1 to 50% by weight.

3. The resin composition according to claim 1, in which the polyolefin is isotactic polypropylene or a copolymer of propylene and other alpha-olefin(s) each having from 2 to 12 carbon atoms than propylene, which has an isotactic structure, or syndiotactic polypropylene or a copolymer of propylene and other alpha-olefin(s) each having from 2 to 12 carbon atoms than propylene, which has a syndiotactic structure.

4. A resin composition comprising a polyolefin and a propylene copolymer substantially having a syndiotactic structure which comprises repeating units of the formula (I):

and from 0.01 to 40 mol % of repeating units of the formula (II):

where n represents 0 or an integer of 1 or more, wherein, of absorption peaks attributed to the methyl groups of the propylene units on an absorption spectrum by $^{13}$C-NMR, the intensity of an absorption peak observed at about 20.2 ppm is 0.3 or more of the intensity of absorption peaks of all the methyl groups attributed to the propylene units, the content of said propylene copolymer being 1 to 50% by weight, and said polyolefin being selected from the group consisting of isotactic polypropylene, syndiotactic polypropylene and copolymers of propylene and ethylene or non-alkenylalcohol alpha-olefins having from 4 to 12 carbon atoms, said copolymer having an isotactic or syndiotactic structure.

5. A resin composition comprising a polyolefin and a propylene copolymer having a syndiotactic structure which comprises repeating units of the formula (I):

and from 0.01 to 40 mol % of repeating units of the formula (II):

where n represents 0 or an integer of 1 or more, wherein, of absorption peaks attributed to the methyl groups of the propylene units on an absorption spectrum by $^{13}$C-NMR, the intensity of an absorption peak observed at about 20.2 ppm is 0.3 or more of the intensity of absorption peaks of all the methyl groups attributed to the propylene units; the content of the propylene copolymer being from 0.1 to 50% by weight.

6. A resin composition comprising a polyolefin and a propylene copolymer having a syndiotactic structure which comprises repeating units of the formula (I):

and from 0.01 to 40 mol % of repeating units of the formula (II):

where n represents 0 or an integer of 1 or more, wherein, of absorption peaks attributed to the methyl groups of the propylene units on an absorption spectrum by $^{13}$C-NMR, the intensity of an absorption peak observed at about 20.2 ppm is 0.3 or more of the intensity of absorption peaks of all the methyl groups attributed to the propylene units, the content of said propylene copolymer being from 1 to 50% by weight, and said polyolefin being selected from the group consisting of isotactic polypropylene, syndiotactic polypropylene and copolymers of propylene and ethylene or non-alkenylalcohol alpha-olefins having from 4 to 12 carbon atoms, said copolymer having an isotactic or syndiotactic structure.

7. A resin composition comprising:

(a) syndiotactic polypropylene or a syndiotactic copolymer of propylene and ethylene or a non-alkenylalcohol alpha-olefin having from 4 to 12 carbon atoms, and (b) a propylene copolymer having a syndiotactic structure which comprises repeating units of the formula (I):

and from 0.01 to 40 mol % of repeating units of the formula (II):

where n represents 0 or an integer of 1 or more, wherein, of absorption peaks attributed to the methyl groups of the propylene units on an absorption spectrum by $^{13}$C-NMR, the intensity of an absorption peak observed at about 20.2 ppm is 0.3 or more of the intensity of absorption peaks of all the methyl groups attributed to the propylene units, the content of said propylene copolymer being 1 to 50% by weight.

8. The resin composition according to claim 7, in which said propylene copolymer having a syndiotactic structure containing the repeating units of the formula (I) and from 0.01 to 40 mol % of the repeating unit of the formula (II) is obtained by copolymerizing propylene and an alkenylsilane of the formula (III):

$$H_2C=CH(CH_2)_n-SiR^1_3 \quad (III)$$

where each of the $R^1$ groups independently represents a hydrogen atom, a halogen atom, or a saturated hydrocarbon residue having from 1 to 20 carbon atoms, and n represents 0 or an integer of from 1 to 20, in the presence of a catalyst system of a transition metal compound having asymmetrically interconnected ligands and an aluminoxane, and then heating the resulting copolymer in the presence of a trialkylamine oxide and KF.HF to convert the —SiR$^1_3$ groups in the copolymer into —OH groups.

9. The resin composition according to claim 8, in which the transition metal compound having asymmetric ligands is a compound represented by the formula (V):

where A and B are different from each other and independently represent a cyclic unsaturated hydrocarbon residue, $R^3$ represents a hydrocarbon residue having from 1 to 20 carbon atoms, or a silicon- or germanium-containing group, X represents a halogen atom, or a hydrocarbon residue having from 1 to 20 carbon atoms, and M represents titanium, zirconium or hafnium; and the aluminoxane is a compound represented by formula (VI):

where $R^5$ represents a hydrocarbon residue having from 1 to 3 carbon atoms, and m represents an integer of from 1 to 50, or the aluminoxane is a compound represented by formula (VII):

where $R^5$ and m have the same meanings as described above.

10. A shaped article comprising the resin composition according to claim 5.

11. A shaped article comprising the resin composition according to claim 6.

12. A film comprising the resin composition of claim 7.

13. The resin composition according to claim 8, wherein the alkenylsilane is selected from the group consisting of vinylsilane, allylsilane, butenylsilane, pentenylsilane and hexenylsilane.

14. The resin composition according to claim 5, wherein the propylene copolymer has an intrinsic viscosity of at least 0.05 dl/g.

15. The resin composition according to claim 13, wherein the copolymer has an intrinsic viscosity of between 0.1 and 10, as measured at 135° C. in the form of a tetralin solution.

* * * * *